(12) United States Patent
Cho et al.

(10) Patent No.: US 11,761,252 B2
(45) Date of Patent: Sep. 19, 2023

(54) LOWER GATE STOPPER STRUCTURE

(71) Applicants: Hyundai Motor Company, Seoul (KR); Kia Corporation, Seoul (KR)

(72) Inventors: Ki Hyun Cho, Hwaseong-si (KR); Sang Hyun Lee, Jeju-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 236 days.

(21) Appl. No.: 17/376,807

(22) Filed: Jul. 15, 2021

(65) Prior Publication Data

US 2022/0205298 A1 Jun. 30, 2022

(30) Foreign Application Priority Data

Dec. 28, 2020 (KR) .................. 10-2020-0184082

(51) Int. Cl.
*B62D 25/02* (2006.01)
*B60J 5/04* (2006.01)
*B62D 33/03* (2006.01)
*E05F 5/02* (2006.01)

(52) U.S. Cl.
CPC .............. *E05F 5/022* (2013.01); *B62D 33/03* (2013.01); *B60J 5/0473* (2013.01); *B62D 25/025* (2013.01); *E05F 5/025* (2013.01); *E05Y 2900/516* (2013.01)

(58) Field of Classification Search
CPC .. E05F 5/022; E05F 5/025; B60J 5/042; B60J 5/0459; B60J 5/0412; B60J 5/0427; B60J 5/0456; B60J 5/0451; B60J 5/0473; B60J 19/38; B60J 2021/0006; B62D 21/157; B62D 25/02; B62D 25/025; B62D 33/03; B60R 19/38; B60R 2021/0006; E05Y 2900/516

See application file for complete search history.

(56) References Cited

U.S. PATENT DOCUMENTS

| | | | |
|---|---|---|---|
| 7,322,636 B1 * | 1/2008 | Woodhouse | B60J 5/0477 296/147 |
| 10,632,951 B2 * | 4/2020 | Nusier | B62D 25/20 |
| 11,590,832 B1 * | 2/2023 | Patel | B60J 5/0459 |
| 2018/0265027 A1 * | 9/2018 | Nusier | B60R 21/16 |
| 2022/0205298 A1 * | 6/2022 | Cho | E05F 5/022 |
| 2022/0205303 A1 * | 6/2022 | Cho | E05F 15/63 |

FOREIGN PATENT DOCUMENTS

| | | | | |
|---|---|---|---|---|
| GB | WO 2020/108853 A1 * | 6/2020 | | B60J 5/0459 |
| KR | 101398097 B1 | 5/2014 | | |

* cited by examiner

*Primary Examiner* — Gregory A Blankenship
(74) *Attorney, Agent, or Firm* — Slater Matsil, LLP

(57) ABSTRACT

An embodiment lower gate stopper structure includes a stopper unit configured to protrude from an upper end of a groove positioned adjacent to an inner surface of a gate, a rack unit connected to the stopper unit and configured to move longitudinally to cause the stopper unit to protrude, and a controller configured to selectively control protrusion of the stopper unit based on an open or closed state of the gate.

20 Claims, 5 Drawing Sheets

LOWER GATE STOPPER STRUCTURE

CROSS-REFERENCE TO RELATED APPLICATIONS

This application claims the benefit of Korean Patent Application No. 10-2020-0184082, filed on Dec. 28, 2020, which application is hereby incorporated herein by reference.

TECHNICAL FIELD

The present disclosure relates to a lower gate stopper structure.

BACKGROUND

Generally, a tailgate is an openable door, which is mounted at the rear end of a wagon-type vehicle, a van or a recreational vehicle so as to allow baggage to be loaded into the rear part of the vehicle.

Such a tailgate is mounted on a vehicle so as to allow a driver to access a baggage compartment defined in the vehicle. By mounting the tailgate at the rear end of the vehicle, it is possible to allow baggage to be conveniently loaded into the baggage compartment and unloaded therefrom and to allow a passenger to get in or out of the vehicle through the rear part of the vehicle.

In future vehicles, tailgate-type doors may be mounted not only to the rear side of the vehicle but also to the lateral side of the vehicle so as to allow entry and exit of baggage and passengers in and out of the vehicle through the lateral side of the vehicle. This type of tailgate, that is, a clamshell-type gate configured to be divided into two gate segments at the center thereof such that the two gate segments respectively open upwards and downwards, requires less force than a single large tailgate and occupies a smaller space in the corresponding part of the vehicle, thereby attracting a lot of attention. Furthermore, the clamshell-type gate offers effects of providing a lower end thereof with a portion on which a passenger may sit or of allowing baggage to be loaded closer to a bumper.

A structure for reinforcing a lateral side of a vehicle, which is constructed to minimize deformation of the vehicle body and thus to improve the safety of passengers using the floor of the vehicle in the event of, for example, a lateral collision, is known in the art. However, there is also demand for a structure capable of efficiently preventing incursion of a gate.

Korea Patent Registration Publication No. 10-1398097 describes information related to the present subject matter.

The above information disclosed in this Background section is only for enhancement of understanding of the background of the invention and therefore it may contain information that does not form the prior art that is already known to a person of ordinary skill in the art.

SUMMARY

The present disclosure relates to a lower gate stopper structure. Particular embodiments relate to a lower gate stopper structure capable of minimizing injury to a passenger and damage to a vehicle when a lateral collision occurs in the closed state of a gate and of supporting the load of a passenger when the passenger gets in or out of the vehicle in the open state of the gate.

Embodiments of the present invention can solve problems associated with the prior art. An embodiment of the present invention provides a lower gate stopper structure capable of selectively protruding a stopper unit under the control of a controller depending on the open or closed state of a gate.

Another embodiment of the present invention provides a lower gate stopper structure, which is constructed such that a stopper unit protrudes when a gate is closed so as to absorb an impact in the event of a lateral collision of a vehicle.

The features of the present invention are not limited to the above-mentioned features, and other features of the present invention, which are not mentioned above, will be clearly understood from the following descriptions of preferred embodiments and will be apparent from the preferred embodiments of the present invention. The above features and other features of embodiments of the present invention may be achieved by the means and combinations thereof disclosed in the claims.

One embodiment of the present invention provides a lower gate stopper structure including a stopper unit adapted to protrude from an upper end of a groove positioned adjacent to an inner surface of a gate, a rack unit, which is connected to the stopper unit and which is moved longitudinally so as to cause the stopper unit to protrude, and a controller adapted to selectively control protrusion of the stopper unit depending on the open or closed state of the gate.

In a preferred embodiment, the stopper unit may include a stopper gear engaged with the rack unit, and at least one stopper adapted to be rotated about the stopper gear.

In another preferred embodiment, the rack unit may include a drive unit adapted to receive information about the open or closed state of the gate and to apply driving force, a rack, which is connected to the stopper gear and is moved longitudinally by the drive unit, a pin guide formed in at least one end of the rack, and a rack restriction pin disposed in the pin guide.

In still another preferred embodiment, a first surface of the stopper may have a length corresponding to the length of an open surface of the groove.

In yet another preferred embodiment, the length of a portion of the stopper that projects from the upper end of the groove may correspond to the length of the groove.

In still yet another preferred embodiment, the controller may control the drive unit to apply the driving force to cause the stopper to protrude when the controller detects a signal indicating a closed gate.

In a further preferred embodiment, the controller may control the drive unit to apply the driving force to insert the stopper into the groove when the controller detects a signal indicating an open gate.

In another further preferred embodiment, the stopper may be completely protruded when the one end of the pin guide is positioned at the rack restriction pin, and may be inserted into the groove when a remaining end of the pin guide is positioned at the rack restriction pin.

In still another further preferred embodiment, the rotational angle of the stopper gear may correspond to the length of the pin guide.

In yet another further preferred embodiment, the lower gate stopper structure may further include a stopper pin formed at an axis of the stopper gear, and the stopper may be rotated about the stopper pin.

Other aspects and preferred embodiments of the invention are discussed infra.

It is to be understood that the term "vehicle" or "vehicular" or other similar terms used herein are inclusive of motor vehicles in general, such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative-fuel vehicles (e.g. fuels derived from resources other than petroleum). As referred to herein, a hybrid vehicle is a vehicle that has two or more sources of power, for example a vehicle powered by both gasoline and electricity.

The above and other features of embodiments of the invention are discussed infra.

BRIEF DESCRIPTION OF THE DRAWINGS

The above and other features of embodiments of the present invention will now be described in detail with reference to certain exemplary embodiments thereof, illustrated in the accompanying drawings which are given hereinbelow by way of illustration only, and thus are not limitative of the present invention, and wherein.

Figure 1:
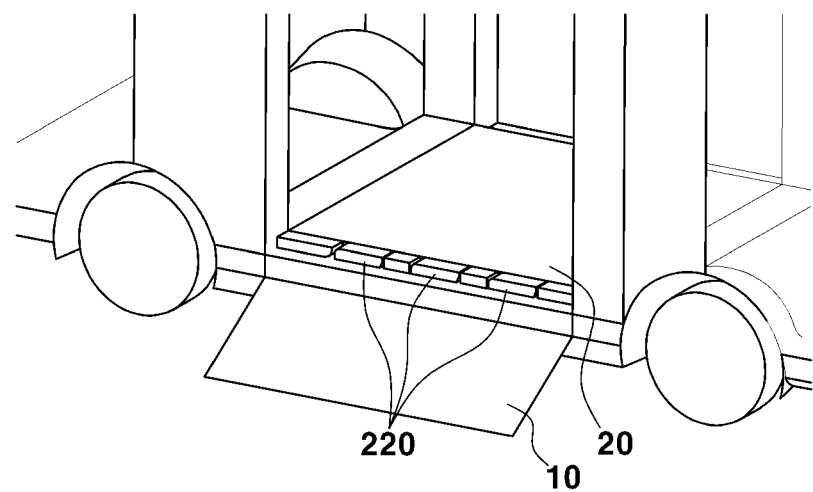
FIG. 1 is a view illustrating a lower gate stopper structure according to an embodiment of the present invention when the gate is opened.

It should be understood that the appended drawings are not necessarily to scale, presenting a somewhat simplified representation of various preferred features illustrative of the basic principles of the invention. The specific design features of embodiments of the present invention as disclosed herein, including, for example, specific dimensions, orientations, locations, and shapes, will be determined in part by the particular intended application and use environment.

In the figures, the reference numbers refer to the same or equivalent parts of embodiments of the present invention throughout the several figures of the drawing.

DETAILED DESCRIPTION OF ILLUSTRATIVE EMBODIMENTS

Hereinafter, embodiments of the present invention will be described in detail with reference to the accompanying drawings. The embodiments of the present invention may be modified into various forms, and the scope of the present invention should not be construed as being limited to the following embodiments. These embodiments are provided so that this disclosure will be thorough and complete, and will fully convey the scope of the disclosure to those skilled in the art.

The term "part", "unit" or "module" means a unit for performing at least one function or action, and may be realized by one or multiple pieces of hardware.

The term "gate" as used herein means both a gate that opens in the longitudinal direction of a vehicle and a gate that opens in the width direction of the vehicle. Embodiments of the present specification are disclosed based on one end of a gate that opens in the width direction of the vehicle.

Furthermore, the term "closed state" as used herein means the state in which both an upper gate and a lower gate are closed, and the term "open state" means the state in which both the upper gate and the lower gate are open.

In the specification, it will be understood that, when an element is referred to as being "on" or "above" another element, it can be directly on the other element, or an intervening element may also be present therebetween. Furthermore, it will be understood that, when an element is referred to as being "beneath" or "below" another element, it can be directly beneath the other element, or an intervening element may also be present therebetween.

In addition, the term "upper end" as used herein means a direction toward the upper end in the vertical direction in the drawing, and the term "lower end" as used herein means a direction toward the lower end in the vertical direction in the drawing.

FIG. 1 is a view illustrating a lower gate stopper structure according to an embodiment of the present invention when the gate is opened.

Referring to FIG. 1, a gate may be a clamshell gate including an upper gate and a lower gate 10 but the upper gate is not depicted. The gate may be constructed such that one end of the upper gate is rotated and opened vertically about the other end thereof adjacent to the roof and the lower gate 10 is provided adjacent to the openable one end of the upper gate. The lower gate 10 may be rotated and opened about the lower surface of the vehicle body.

Figure 3:
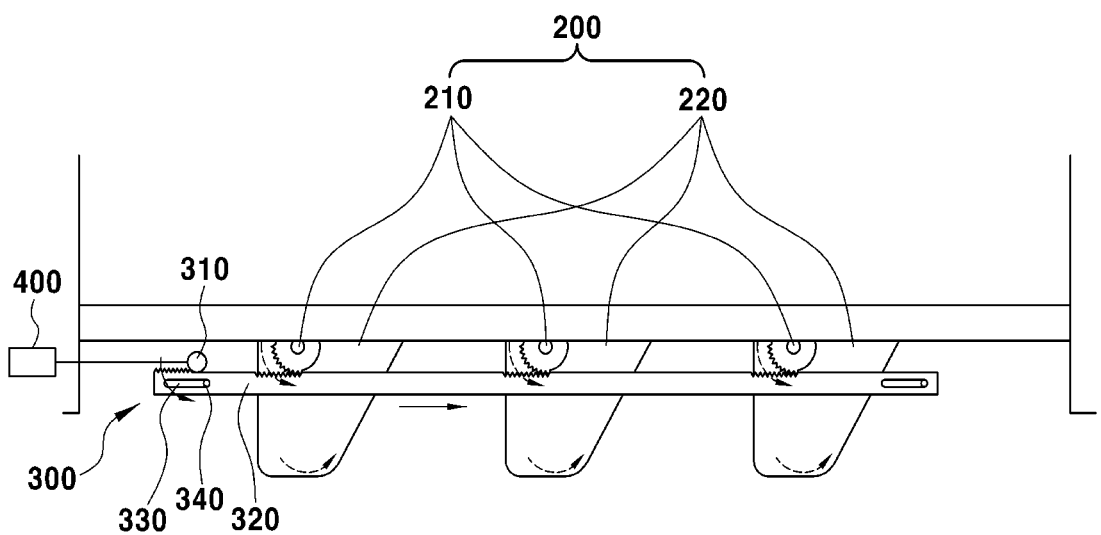
FIG. 3 is a view illustrating the case in which a signal indicating the closed gate is detected by the controller of the lower gate stopper structure according to an embodiment of the present invention.

The lower gate stopper structure according to an embodiment of the present invention may include a stopper unit 200, a rack unit 300 and a controller 400 (see, e.g., FIG. 3). The stopper unit 200 may be positioned at the inner surface of the gate, and may be made to protrude. Preferably, one or more grooves 100 may be formed in the floor 20 of the vehicle, and the stopper unit 200 may be made to protrude from the upper end of the grooves 100. The stopper unit 200 may be positioned adjacent to the inner surface of the gate, and may be made to protrude.

The grooves 100 may be formed adjacent to the hinge axis of the gate. The grooves 100 may be formed in the outer end of the floor 20 of the vehicle body such that the stopper unit 200 protrudes at a position adjacent to the inner surface of the gate.

The stopper unit 200 may include stopper gears 210 and stoppers 220. Preferably, the stoppers 220 may include one or more stoppers, which are adapted to rotate about the stopper gears 210.

The controller 400 may selectively control the protrusion of the stopper unit 200 depending on the open or closed state of the gate. Preferably, when a signal indicating an open gate is detected, the controller 400 may perform control to cause the stopper unit 200 to be inserted into the grooves 100. After the stopper unit 200 is inserted into the grooves 100, the gate may be opened. In another embodiment, the gate may be opened while the stopper unit 200 is inserted into the grooves 100.

When the gate is completely opened, a passenger may get in or out of the vehicle through the opened gate. Preferably, when a passenger gets in or out of the vehicle, the stopper unit 200, which is positioned at the inner surface of the gate, may be in the state of being inserted into the vehicle body. At this time, the stopper unit 200 may define a portion of the floor 20 of the vehicle so as to prevent interference between a passenger and the stopper unit 200 when a passenger gets in or out of the vehicle.

Figure 2:
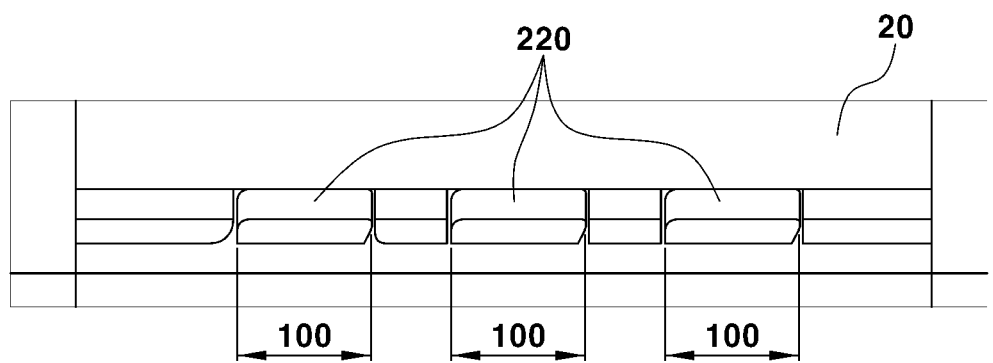
FIG. 2 is a view illustrating the lower gate stopper structure according to an embodiment of the present invention in which stoppers are inserted into grooves when the gate is opened.

FIG. 2 is a view illustrating the lower gate stopper structure according to an embodiment of the present invention in which the stoppers 220 are inserted into the grooves 100 when the gate is opened.

Referring to FIG. 2, the stoppers 220 may be constructed such that the length of a first surface of each of the stoppers 220 corresponds to the length of the open surface of a corresponding one of the grooves 100. The first surface of the stopper 220 may be the surface of the stopper 220 that is exposed to the outside when the stopper 220 is in the state of being inserted into the groove 100. The first surface of the stopper 220 may define a portion of the floor 20 by blocking the open surface of the groove 100. The stopper 220 may be inserted into the groove 100 so as to be flush with the surface of the floor 20. Consequently, it is possible to prevent a passenger from being caught by the stopper 220 or the groove 100 when the passenger gets in or out of the vehicle.

FIG. 3 is a view illustrating the case in which the signal indicating the closed gate is detected by the controller 400 of the lower gate stopper structure according to an embodiment of the present invention.

Referring to FIG. 3, the rack unit 300 may be engaged with the stopper unit 200. Preferably, the stopper unit 200 may be caused to protrude by the longitudinal movement of the rack unit 300. The stopper unit 200 may include the stopper gears 210, which are engaged with the rack unit 300.

The rack unit 300 may include a drive unit 310, a rack 320, a pin guide 330, and a rack restriction pin 340. The drive unit 310 may receive information about the open or closed state of the gate from the controller 400, and may thus apply driving force. The drive unit 310 is not limited to a specific construction such as an actuator or a motor as long as the construction is capable of applying driving force. In an embodiment of the present invention, the drive unit 310 may be an actuator that is rotatable so as to move the rack 320 longitudinally. The drive unit 310 may be in contact with the upper end of the rack 320, and may move the rack 320 longitudinally.

The rack 320 may be connected to the stopper gears 210, and may be moved longitudinally by the drive unit 310. Preferably, the rack 320 may be engaged with one or more stopper gears 210. The rack 320 may extend along a side surface of the vehicle under the floor 20 of the vehicle body.

The stopper gears 210 may be spaced apart from each other by a predetermined interval, and may be engaged with the upper portion of the rack 320. The stoppers 220 may be spaced apart from each other by a predetermined interval so as to be rotated about the respective stopper gears 210. The grooves 100 may be formed in the floor 20 of the vehicle body so as to correspond to the distance between the stoppers 220.

The pin guide 330 may be formed in at least one end of the rack 320. Preferably, the pin guide 330 may include a pair of pin guides, which are respectively formed in the two ends of the rack 320. The rack restriction pin 340 may be disposed in the pin guide 330.

When one end of the pin guide 330 is positioned at the rack restriction pin 340, the stoppers 220 may be completely protruded. When the other end of the pin guide 330 is positioned at the rack restriction pin 340, the stoppers 220 may be inserted into the grooves 100.

Preferably, the pin guide 330 may have a length corresponding to the rotational angle of the stopper gears 210. When the stoppers 220 are made to protrude, the longitudinal movement of the pin guide 330 may be limited by the rack restriction pin 340. Accordingly, the rotational angle of the stoppers 220 may be limited while the stoppers 220 are made to protrude.

When the stoppers 220 are inserted into the grooves 100, the amount of the longitudinal movement of the pin guide 330 may be limited by the rack restriction pin 340. Accordingly, the rotational angle of the stoppers 220 may be limited while the stoppers 220 are inserted into the grooves 100.

When the controller 400 detects the signal indicating the closed gate, the controller 400 may perform control to pop up the stoppers 220 using the driving force from the drive unit 310. Preferably, the controller 400 may rotate the drive unit 310 upon detection of the signal indicating the closed gate.

The drive unit 310 may receive information about the closed state of the gate from the controller 400, and may apply driving force to the rack 320. Preferably, the drive unit 310 may move the rack 320 longitudinally by the rotation thereof. When the controller 400 detects the signal indicating the closed gate, the controller 400 may control the drive unit 310 to move the rack 320 forward.

In FIG. 3, when the rack 320 is moved in the forward direction of the vehicle, the stopper gears 210 may be rotated counterclockwise. Hence, the stoppers 220 may be rotated counterclockwise about the respective stopper gears 210, and may thus be made to protrude. The rotational angle of the stopper gears 210 may correspond to the length of the pin guide 330. Accordingly, the stoppers 220 may be made to protrude to a predetermined angle.

Figure 4:
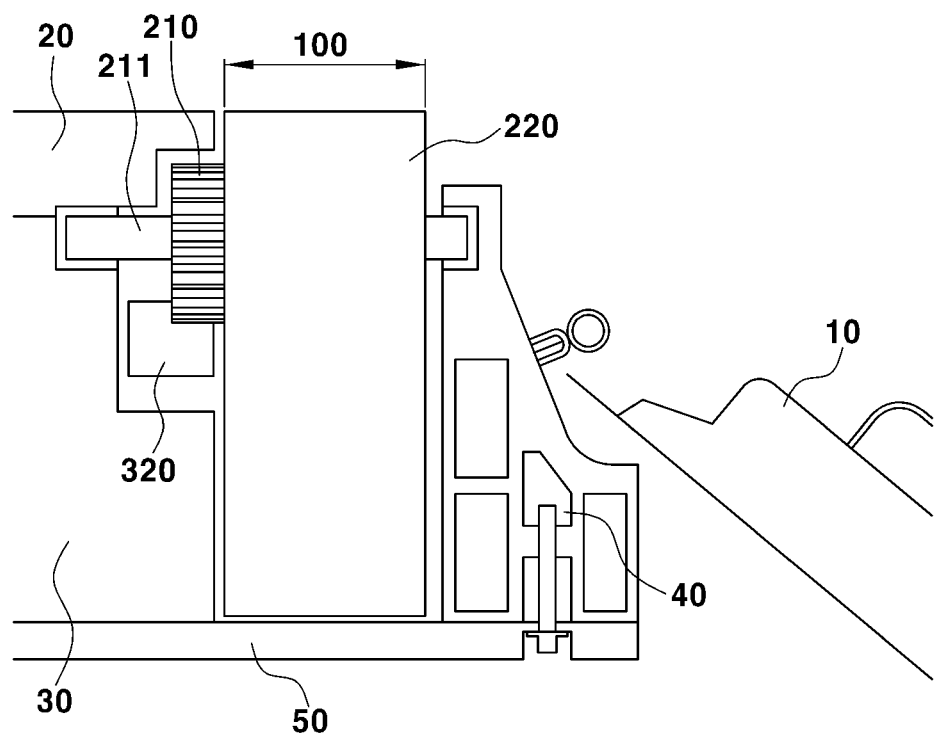
FIG. 4 is a cross-sectional view illustrating the lower gate stopper structure according to an embodiment of the present invention when the gate is opened.

FIG. 4 is a cross-sectional view illustrating the lower gate stopper structure according to an embodiment of the present invention when the gate is opened.

Referring to FIG. 4, the lower gate stopper structure according to an embodiment of the present invention may further include stopper pins 211, which are located at the axes of respective stopper gears 210. The stopper pins 211 may extend through the stoppers 220 and the stopper gears 210, and may be fixed to the vehicle body. The stoppers 220 may be rotated about respective stopper pins 211 to a predetermined angle.

A vehicle, to which the lower gate stopper structure according to an embodiment of the present invention is applicable, may be a hybrid vehicle or an electric vehicle such as a PHEV (Plug in Hybrid Electric Vehicle) or a HEV (Hybrid Electric Vehicle), in which a battery 30 is positioned on the lower surface of the vehicle body. The battery 30 may be mounted inside the stoppers 220. The width of each of the stoppers 220 may be set to avoid reducing the amount of space to mount the battery 30. The hinge axis of the lower gate 10 may be positioned outside the stoppers 220.

A lower cover 50 may be provided under the battery 30 and the stoppers 220. A side sill 40 is provided outside the stoppers 220, and the stopper pins 211 may extend through the side sill 40 and may be held thereby.

Figure 5:
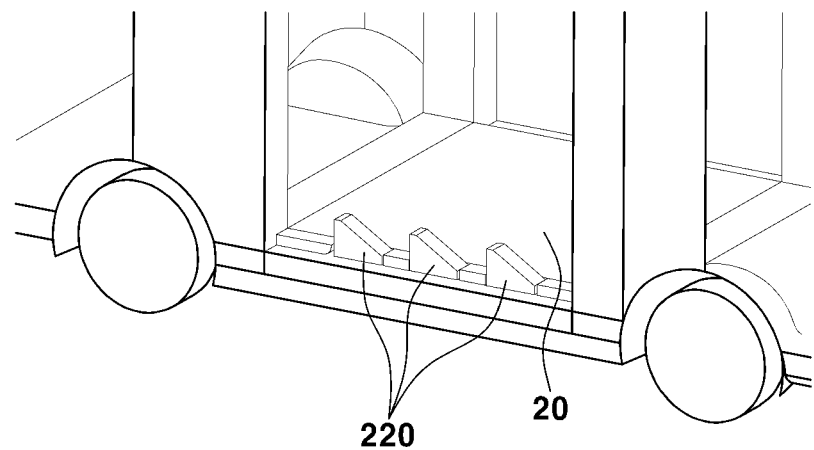
FIG. 5 is a view illustrating the lower gate stopper structure according to an embodiment of the present invention when the gate is closed.

FIG. 5 is a view illustrating the lower gate stopper structure according to an embodiment of the present invention when the gate is closed.

The controller 400 may receive the signal indicating the closed gate. When the controller 400 detects the signal indicating the closed gate, the drive unit 310 applies driving force to pop up the stoppers 220 from the grooves 100. Preferably, the controller 400 may rotate the drive unit 310 upon detecting the signal indicating the closed gate.

When the gate is completely closed, the stoppers 220 may be maintained in the state of being protruded from the grooves 100 by the controller 400. Since the stoppers 220, which have protruded, and the inner surface of the gate 10 are positioned adjacent to each other in the closed state, it is possible to improve stability in the event of a collision.

Figure 6:
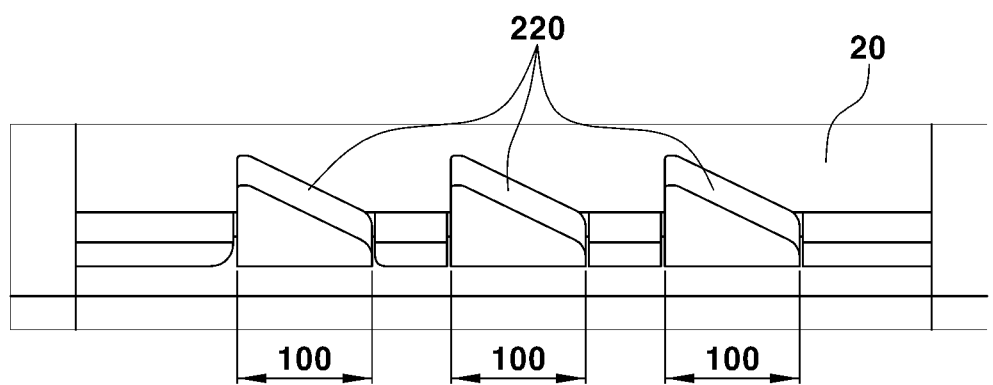
FIG. 6 is a view illustrating the lower gate stopper structure according to an embodiment of the present invention, in which the stoppers are made to protrude from the grooves when the gate is closed.

FIG. 6 is a view illustrating the lower gate stopper structure according to an embodiment of the present invention, in which the stoppers 220 are made to protrude from the grooves 100 when the gate is closed.

Referring to FIG. 6, the length of each of the stoppers 220 protruding from the upper surfaces of the grooves 100 may correspond to the length of a corresponding one of the grooves 100. The bottom surface of each of the stoppers 220 is parallel to the floor of the vehicle when the stoppers have protruded. Since the stoppers 220 have protruded so as to block the open surfaces of the grooves 100, it is possible to restrict movement of the stoppers 220 in the event of a lateral collision. Accordingly, it is possible to efficiently absorb collision energy transmitted to the floor 20 of the vehicle body.

Figure 7:
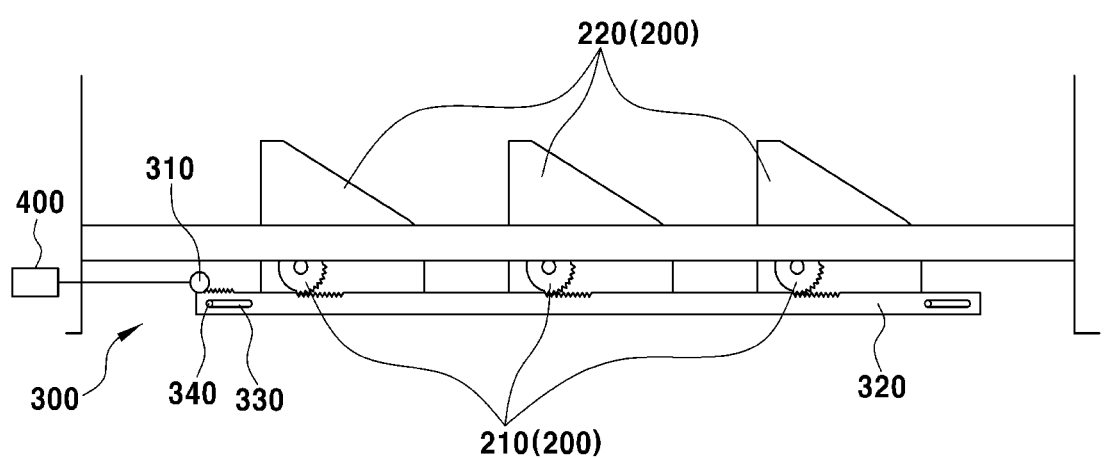
FIG. 7 is a view illustrating the stopper unit and the rack unit of the lower gate stopper structure according to an embodiment of the present invention when the gate is closed.
Figure 8:
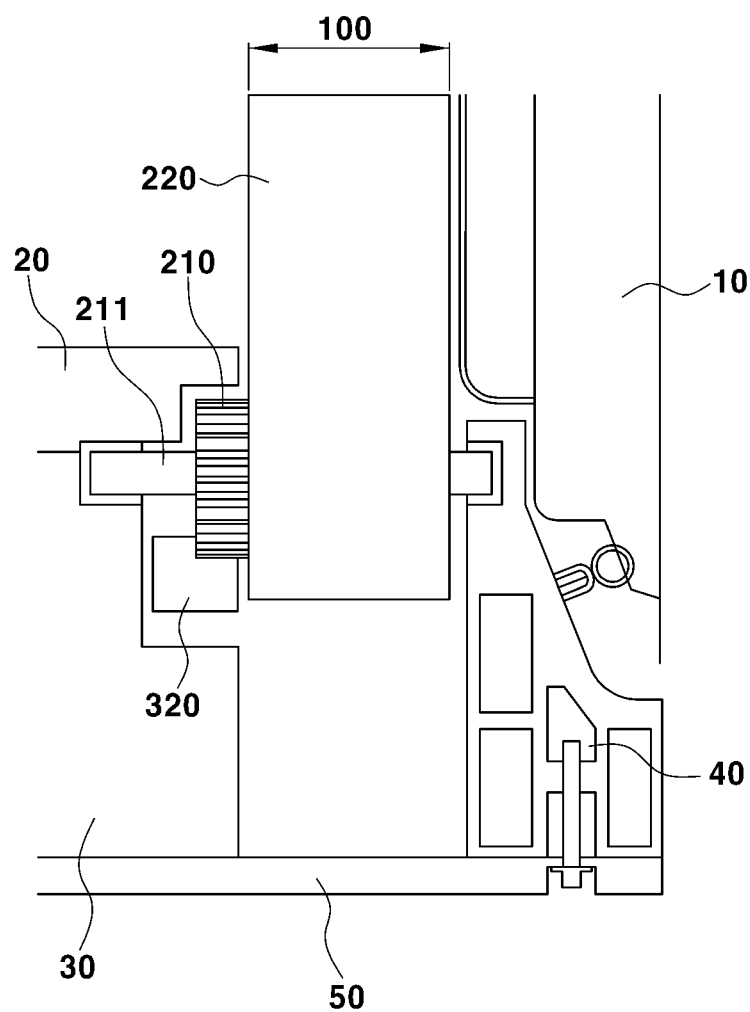
FIG. 8 is a cross-sectional view illustrating the lower gate stopper structure according to an embodiment of the present invention when the gate is closed.

FIG. 7 is a view illustrating the stopper unit 200 and the rack unit 300 of the lower gate stopper structure according to an embodiment of the present invention when the gate is closed. FIG. 8 is a cross-sectional view illustrating the lower gate stopper structure according to an embodiment of the present invention when the gate is closed.

The stoppers 220 may be maintained in the popped-up state while the gate is in the closed state. Only a portion of each of the stoppers 220 may be exposed upwards from the floor 20 of the vehicle when the stoppers 220 are made to protrude. Herein, a portion (or one end) of each of the first surfaces of the stoppers 220 may be positioned adjacent to the rack 320 under the floor 20.

When the controller 400 detects the signal indicating the open gate, the drive unit 310 may apply driving force to insert the stoppers 220 into the grooves 100. Preferably, the controller 400 may detect the signal indicating the open gate, and may rotate the drive unit 310.

The drive unit 310 may receive the information about the open gate from the controller 400, and may apply driving force to the rack 320. Preferably, the drive unit 310 may move the rack 320 longitudinally by the rotation thereof. When the controller 400 detects the signal indicating the open gate, the controller 400 may control the drive unit 310 to move the rack 320 in the rearward direction of the vehicle.

When the rack 320 is moved in the rearward direction of the vehicle, the stopper gears 210 may be rotated clockwise. The stoppers 220 may be rotated clockwise about the respective stopper gears 210, and may be inserted into the respective grooves 100. The rotational angle of each of the stopper gears 210 may correspond to the length of the pin guide 330. Accordingly, the stoppers 220 may be inserted into the grooves 100 while being rotated to a predetermined angle.

Meanwhile, the stoppers 220 may be made to protrude while being rotated to a predetermined angle about the respective stopper pins 211. As illustrated in FIG. 8, the stoppers 220 may absorb collision energy through the surface thereof adjacent to the inner surface of the gate when the gate 10 is in the closed state.

In summary, embodiments of the present invention provide a lower gate stopper structure capable of selectively causing the stopper unit 200 to protrude under the control of the controller 400 depending on the open or closed state of the gate and, in the event that the vehicle is involved in a lateral collision, capable of absorbing an impact owing to the stopper unit 200, which protrudes when the gate is closed.

By virtue of the above-described constructions of the embodiments and combinations thereof, embodiments of the present invention offer the following effects.

Since the stopper unit is selectively made to protrude by the controller, there are effects of allowing a passenger to get in or out of the vehicle without interference with the stopper unit while the gate is open and of absorbing the energy of a lateral collision of the vehicle while the gate is closed.

Furthermore, since the stopper unit protrudes when the gate is closed, there is an effect of efficiently preventing incursion of the gate by means of the stoppers in the event of a collision and of ensuring passenger safety.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A lower gate stopper structure comprising:
   a stopper unit configured to protrude from an upper end of a groove positioned adjacent to an inner surface of a gate;
   a rack unit connected to the stopper unit and configured to move longitudinally to cause the stopper unit to protrude; and
   a controller configured to selectively control protrusion of the stopper unit based on an open or closed state of the gate; and
   wherein the stopper unit comprises:
      a stopper gear engaged with the rack unit; and
      at least one stopper configured to be rotated about the stopper gear.

2. The lower gate stopper structure of claim 1, wherein a first surface of the stopper has a length corresponding to a length of an open surface of the groove.

3. The lower gate stopper structure of claim 1, wherein a length of a portion of the stopper that protrudes from the upper end of the groove corresponds to a length of the groove.

4. The lower gate stopper structure of claim 1, further comprising a stopper pin formed at an axis of the stopper gear, wherein the stopper is configured to be rotated about the stopper pin.

5. A lower gate stopper structure comprising:
   a stopper unit configured to protrude from an upper end of a groove positioned adjacent to an inner surface of a gate;
   a rack unit connected to the stopper unit and configured to move longitudinally to cause the stopper unit to protrude; and
   a controller configured to selectively control protrusion of the stopper unit based on an open or closed state of the gate;
   wherein the stopper unit comprises:
      a stopper gear engaged with the rack unit; and at least one stopper configured to be rotated about the stopper gear; and wherein the rack unit comprises:
a drive unit configured to receive information about the open or closed state of the gate and to apply a driving force;
a rack connected to the stopper gear and configured to move longitudinally by the driving force of the drive unit;
a pin guide formed in at least one end of the rack; and
a rack restriction pin disposed in the pin guide.

6. The lower gate stopper structure of claim 5, wherein the controller is configured to control the drive unit to apply the driving force to cause the stopper to protrude when the controller detects a signal indicating the closed state of the gate.

7. The lower gate stopper structure of claim 5, wherein the controller is configured to control the drive unit to apply the driving force to insert the stopper into the groove when the controller detects a signal indicating the open state of the gate.

8. The lower gate stopper structure of claim 5, wherein the stopper is completely protruded when a first end of the pin guide is positioned at the rack restriction pin, and is inserted into the groove when a second end of the pin guide is positioned at the rack restriction pin.

9. The lower gate stopper structure of claim 5, wherein a rotational angle of the stopper gear corresponds to a length of the pin guide.

10. The lower gate stopper structure of claim 5, wherein a first surface of the stopper has a length corresponding to a length of an open surface of the groove.

11. The lower gate stopper structure of claim 5, wherein a length of a portion of the stopper that protrudes from the upper end of the groove corresponds to a length of the groove.

12. The lower gate stopper structure of claim 5, further comprising a stopper pin formed at an axis of the stopper gear, wherein the stopper is configured to be rotated about the stopper pin.

13. The lower gate stopper structure of claim 1, wherein the rack unit comprises:
a drive unit configured to receive information about the open or closed state of the gate and to apply a driving force; and
a rack connected to the stopper gear and configured to move longitudinally by the driving force of the drive unit.

14. The lower gate stopper structure of claim 13, wherein the controller is configured to:

control the drive unit to apply the driving force to cause the stopper to protrude in response to detection of a signal indicating the closed state of the gate; and
control the drive unit to apply the driving force to insert the stopper into the groove in response to detection of a signal indicating the open state of the gate.

15. A vehicle comprising:
a vehicle body comprising a floor having a groove formed therein;
a lower gate coupled to the vehicle body;
a stopper unit positioned adjacent to an inner surface of the lower gate and configured to protrude from an upper end of the groove;
a rack unit connected to the stopper unit and configured to move longitudinally to cause the stopper unit to protrude; and
a controller configured to selectively control protrusion of the stopper unit based on an open or closed state of the lower gate; and
wherein the stopper unit comprises:
a stopper gear engaged with the rack unit; and
at least one stopper configured to be rotated about the stopper gear.

16. The vehicle of claim 15, wherein a first surface of the stopper has a length corresponding to a length of an open surface of the groove.

17. The vehicle of claim 15, wherein a length of a portion of the stopper that protrudes from the upper end of the groove corresponds to a length of the groove.

18. The vehicle of claim 15, further comprising a stopper pin formed at an axis of the stopper gear, wherein the stopper is configured to be rotated about the stopper pin.

19. The vehicle of claim 15, wherein the rack unit comprises:
a drive unit configured to receive information about the open or closed state of the lower gate and to apply a driving force;
a rack connected to the stopper gear and configured to move longitudinally by the driving force of the drive unit;
a pin guide formed in at least one end of the rack; and
a rack restriction pin disposed in the pin guide.

20. The vehicle of claim 19, wherein the controller is configured to:
control the drive unit to apply the driving force to cause the stopper to protrude when the controller detects a signal indicating the closed state of the lower gate; and
control the drive unit to apply the driving force to insert the stopper into the groove when the controller detects a signal indicating the open state of the lower gate.

* * * * *